United States Patent [19]

Breau

[11] 4,194,449
[45] Mar. 25, 1980

[54] DOUBLE DOLLY

[76] Inventor: Arisma J. Breau, 131 North Bonnington Avenue, Scarboro, Ontario, Canada

[21] Appl. No.: 910,606

[22] Filed: May 30, 1978

Related U.S. Application Data

[63] Continuation-in-part of Ser. No. 756,125, Jan. 3, 1977, abandoned.

[51] Int. Cl.² ............................................. B61B 13/00
[52] U.S. Cl. ................................ 104/172 B; 104/162; 198/728
[58] Field of Search ......... 104/172 B, 172 R, 172 BT, 104/172 C, 178, 165, 162; 198/719, 728, 733, 748; 29/110, 116 R

[56] References Cited

U.S. PATENT DOCUMENTS

| 3,260,219 | 7/1966 | Vani | 104/172 B |
|---|---|---|---|
| 3,568,606 | 3/1971 | Grant | 104/172 B |
| 3,596,605 | 8/1971 | Shelstad | 104/172 B |
| 3,745,932 | 7/1973 | Czerwinski | 104/172 B |
| 3,815,512 | 6/1974 | Balas | 104/172 B |
| 3,848,542 | 11/1974 | Schied et al. | 104/172 B |

FOREIGN PATENT DOCUMENTS 2017089 10/1971 Fed. Rep. of Germany ....... 104/172 B

*Primary Examiner*—Randolph A. Reese

[57] ABSTRACT

The specification describes a double dolly for use with a conveyor for moving an object by engagement with the object. The double dolly comprises a first roller, which rotates about a first axle, a second support roller which rotates about a second axle, a rotatable safety bar located in advance of and below the lower reach of the first roller, and a frame for securing the rollers, axles and safety bar to a conveyor. The first roller, which engages the object is freely rotatable prior to contact with the object. The support roller is in contact with the surface over which the object is being moved for transferring load exerted on the dolly by the object to that surface while permitting movement of the dolly. The safety bar blocks the gap between the supporting surface and the first roller. The rotatability of the safety bar prevents its binding on the supporting surface in the event of tipping of the dolly.

3 Claims, 4 Drawing Figures

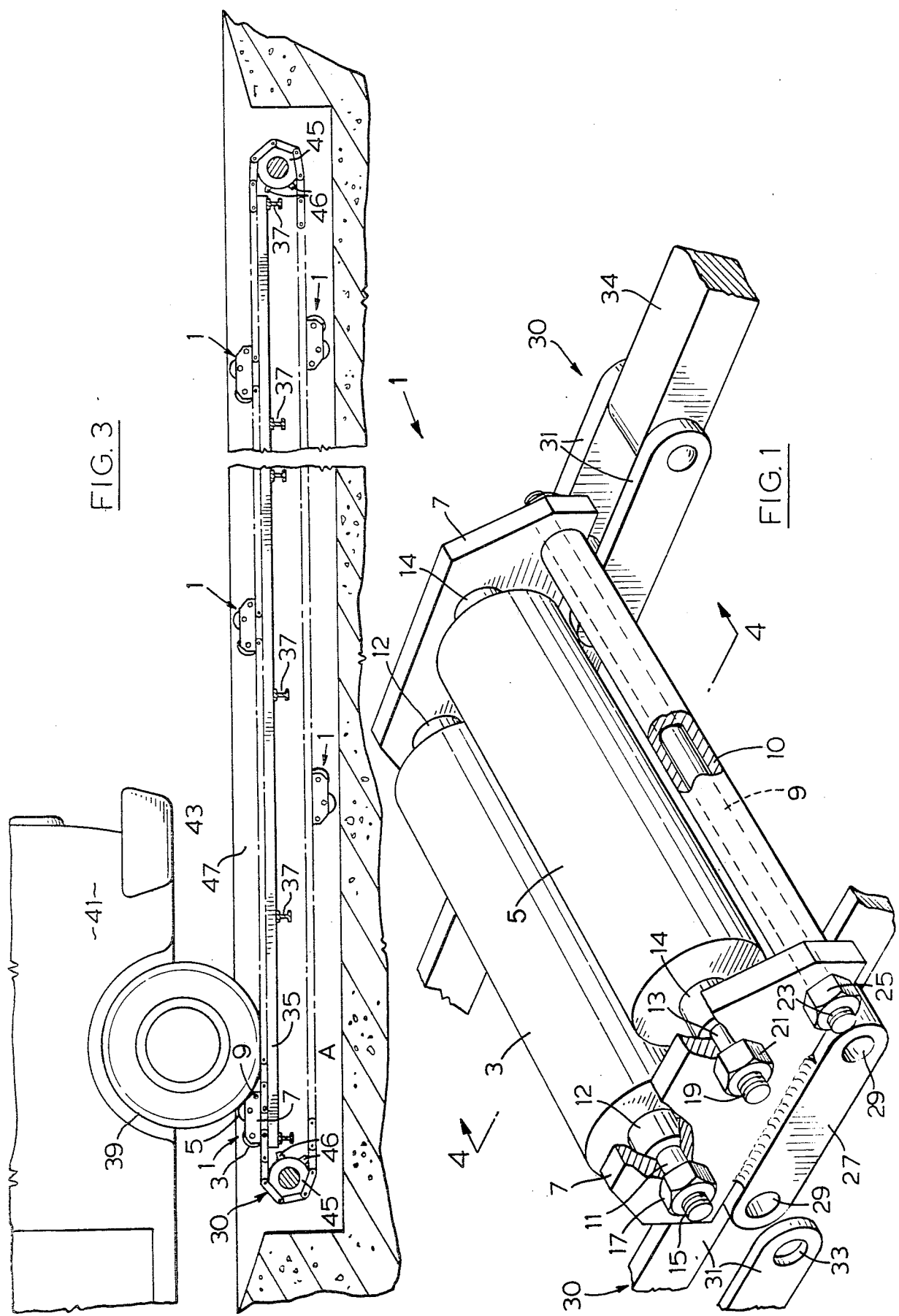

DOUBLE DOLLY

RELATED CASES

This is a continuation in part patent application of U.S. patent application Ser. No. 756,125, filed Jan. 3rd, 1977 in the name of Arisma Joseph Breau, now abandoned.

FIELD OF THE INVENTION

This invention relates to a dolly for use with a conveyor for moving an object over the path of the conveyor.

BACKGROUND OF THE INVENTION

As described in the above referenced application, in the past, numerous difficulties have been encountered in operating systems employing conveyorized dollies. A specific example of a conveyorized dolly system is a car wash, in which difficulties have arisen as a result of inadequacies in the dollies used for moving an automobile through the car wash.

In a car wash the automobile is driven to the entrance of the car wash. One of the front tires is aligned with a car wash track. The car is then moved forward with the front tire sitting in or on the track. The transmission of the automobile is placed in neutral out of gear and a dolly secured to a pair of drive chains is moved to a position where it engages the rear of the tire. The dolly which is secured to the chains then pushes on the tire to move the automobile through the car wash.

The dolly is supported by the track, and therefore, must include a roller in contact with the track for rolling the dolly along the track as the chains are moved. Since the dolly is moving in the same direction as the automobile, the roller in contact with the track and the automobile tire must rotate in the same direction. If the roller in contact with the track engages the automobile tire, it binds with the tire and rides under the tire because of its direction of rotation. Therefore, the dolly must also include a second roller which is out of contact with the track and which is freely rotatable. It is the second roller which is freely rotatable that engages the automobile tire. The second roller rotates in the opposite direction to both the contact roller and the tire when engaged by the tire. Therefore, the purpose of the second roller is to permit rotation of the tire in a manner such that there is no binding between the dolly and the tire.

As can be appreciated from the above description, the lower reach of the second roller must be above the lower reach of the support roller to prevent contact between the second roller and the car wash track. However, as a result of this positioning of the two rollers with respect to one another, a gap exists between the freely rotatable roller and the track, and in order to compensate for tipping of the dolly, this gap is generally great enough to permit an operator's foot or hand to ride beneath the dolly when it is not blocked by the automobile tire. This therefore necessitates the use of a safety bar for blocking this gap. Such an arrangement is shown in U.S. Pat. No. 3,260,219.

It has been discovered through the use of dollies in car washes that the drive chains cannot be tightened to the extent that tipping of the dolly under the initial load is prohibited. This tipping results inbinding between the safety bar and the supporting track surface, which binding causes damage to both the track and the safety bar, and necessitates the frequent replacement of the safety bar.

The double dolly according to the present invention has been constructed to overcome the above-mentioned drawbacks of the prior art devices. It consists of a first roller which rotates about a first axle, a second roller which is located forwardly of the first roller with its lower reach above the lower reach of the first roller and which rotates about a second axle, a frame for securing the rollers and axles to the conveyor, and a safety bar secured to the frame in advance of and below the lower reach of the second roller. The second roller is freely rotatable and free of load and is positioned to prevent contact between the first roller and the object which the dolly is moving over the supporting surface. The first roller is a support roller for transferring load exerted on the dolly to the supporting surface. The safety bar is clear of the supporting surface when the dolly is free of load and is adapted to rotatably engage the supporting surface and to prevent binding upon coming into contact therewith when the dolly is under load.

BRIEF DISCUSSION OF THE DRAWINGS

The aforementioned and other objects, advantages and features of the invention will become apparent in the following detailed description of a preferred embodiment showing a double dolly, according to this invention, as used in a car wash wherein:

FIG. 1 is a perspective view of a double dolly according to this invention;

FIG. 3 is a side sectional elevational view of a car wash showing a series of double dollies secured to chain means in an automobile car wash.

DETAILED DESCRIPTION OF THE PREFERRED EMBODIMENTS

Figure 4:
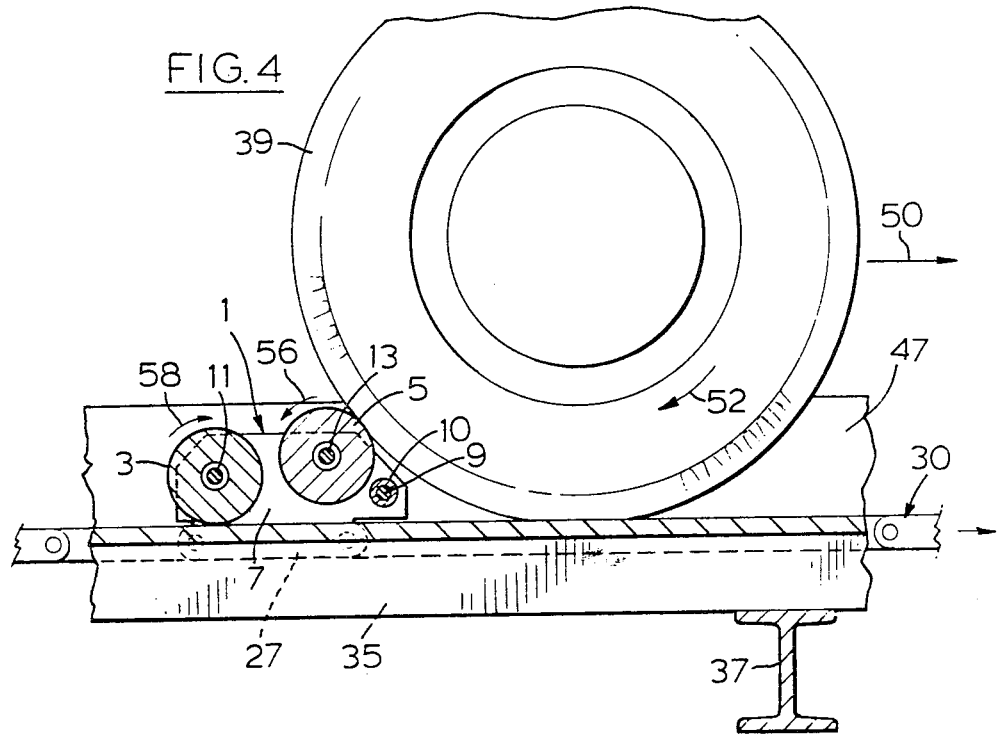
FIG. 4 is a side sectional view showing a double dolly in contact with the rear portion of an automobile tire.

In FIG. 1 a double dolly generally indicated at 1 includes a rear roller 3 and a forward roller 5, both of which are secured to a pair of brackets 7 located outwardly of the rollers. Also secured between brackets 7 is a safety bar 9. Rear roller 3 rotates about axle 11 provided at its outer ends with threads 15. Axle 11 is held in place by means of nuts 17 which threadably engage thread 15 of axle 11. Located between the outer ends of rear roller 3 and brackets 7 are collars 12.

Forward roller 5 is mounted in much the same manner as is rear roller 3. The forward roller 5 rotates about axle 13 provided at its outer ends with threads 19. Axle 13 is secured to brackets 7 by means of threaded nuts 21. Collars 14 are secured between the ends of roller 5 and brackets 7. The collars at the ends of the rollers act as spacers to space the rollers from the conveyor and the brackets to enhance the rotation of the rollers.

The safety bar which is provided at its outer ends with threads 23 is secured between brackets 7 by means of threaded nuts 25. Provided over safety bar 9 is a sleeve 10, the purpose of which will be described later.

Brackets 7 are provided with downwardly extending securing portions 27. Each of these securing portions includes a pair of apertures 29. Apertures 29 are located adjacent the extremities of the securing portions. In order to secure the double dolly to chain 30 apertures 29 of securing portion 27 are aligned with apertures 33 of chain links 31. Bolts or other securing means (not shown) are fitted through the aligned apertures to attach the double dolly to links 31 of chain 30. Links 31 are in turn secured to connector 33.

Figure 2:
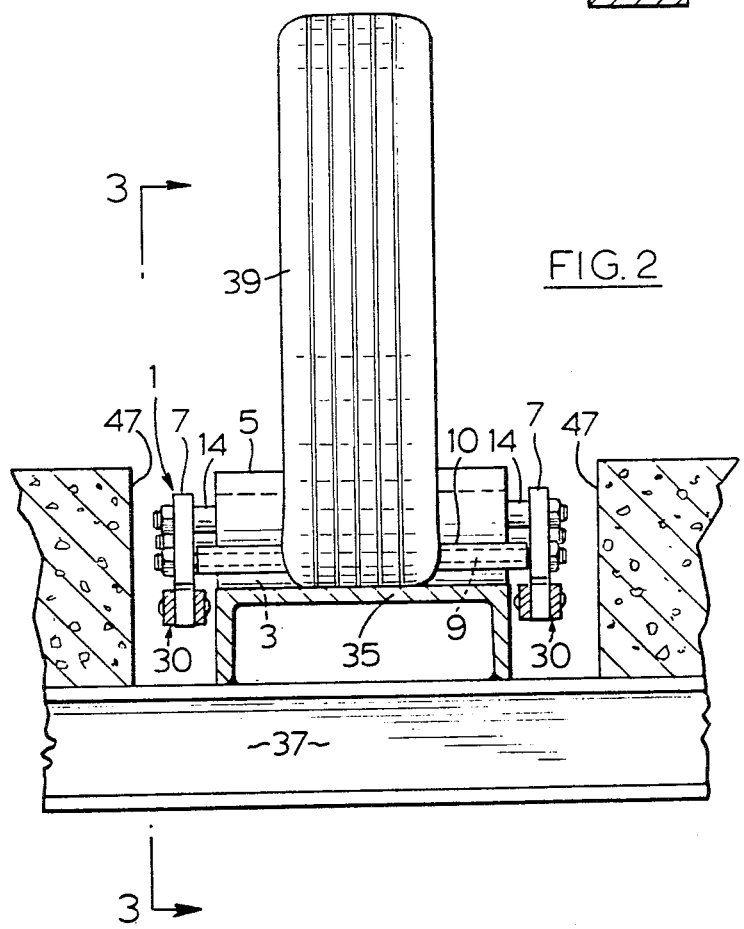
FIG. 2 is a front elevational view of a double dolly in contact with the rear portion of an automobile tire.

FIG. 3 shows a series of double dollies. They are secured to a pair of chains 30 only one of which can be seen in the Figure. The chains are located between a pair of upstanding walls 47 extending upwardly from both sides of the car wash track. The chains driven by a pair of drive rollers 45 each of which is provided with teeth 46 for engaging the links of the chains. Each of the double dollies 1 rides on a track 35 as best shown in FIGS. 2 and 4. Track 35 is supported by support members 37 so as to bear the weight of an automobile 41 which moves over the track when pushed by one of the double dollies. As shown in FIG. 3 the arrangement and size of all the components in the car wash must be such that the bottom portion 43 of the automobile will freely pass thereover.

The double dolly functions in the following manner:

Automobile 41 is driven to the entrance of the car wash. Chains 30 provided with a series of double dollies 1 are rotated by drive rollers 45 such that one of the double dollies is located at approximately position A shown in FIG. 3. The automobile is then driven forward until front tire 39 rests on track 35 between upstanding walls 47. The person driving the automobile then places the transmission in neutral. Chains 30 are again rotated until one of the double dollies 1 contacts the rear portion of the tire to move the automobile through the carwash as will be described hereinafter in more detail. The automobile is not steered during its travel through the car wash.

Referring primarily to FIG. 4, the only part of the double dolly to contact the tire is forward roller 5 which prior to contact is freely rotatable. Safety bar 9 which is located in advance of the forward roller is positioned below the lower reach of the forward roller and blocks the gap between the forward roller and the car wash track. It is also remote from the area of contact between the forward roller and the automobile tire. Rear roller 3 is located behind forward roller 5 out of contact with the automobile tire.

As chains 30 are driven by drive rollers 45 in the direction clockwise the double dolly contacting the automobile tire moves the automobile in the direction of arrow 50. The automobile exerts a reactive force and this force is transferred to the double dolly through the area of contact between the forward roller and the rear portion of the automobile tire. As can be appreciated by FIG. 4, the reactive force would have both a horizontal and vertical component because the double dolly is located at the lower rear portion of the tire. Therefore, the double dolly must have both horizontal and vertical support. The horizontal support is provided by chains 30 and the horizontal component of the reactive force is transferred to the chains by means of brackets 7. The vertical component of the force is supported by the rear roller and the safety bar as will be more fully described hereinafter.

As the automobile moves in the direction of arrow 50, tire 39 rotates in the direction of arrow 52 as a result of the force exerted on the tire by the double dolly. As can be appreciated from the drawings and as earlier mentioned, forward roller 5 is freely rotatable prior to contacting the tire so that roller 5 is permitted to rotate in the direction of arrow 56 as the automobile is being moved through the car wash. If forward roller 5 were not freely rotatable or if it rotated in the same direction as tire 39, the tire would bind with the forward roller and would either jump from the track, or roll over the double dolly. However, because forward roller 5 is freely rotatable tire 39 rotates in the direction of arrow 42 with roller 5 rotating in the opposite direction while the automobile is being pushed in the direction of arrow 50 thereby eliminating essentially all binding problems.

Since double dolly 1 is moving in the direction of arrow 50, that is in the same direction as the automobile, and because rear roller 3 is also in contact with track 35, it must rotate in the same direction as tire 39. The direction of rotation of rear roller 3 is indicated by arrow 58. Rear roller 3 acts as a "tire for the dolly" because the function fulfilled by the rear roller is to support the dolly in much the same manner as tire 39 supports automobile 41.

FIG. 2 shows the rear roller 3 extending across substantially the entire width of the car wash track. Therefore, the load exerted on the dolly is transferred through the rear support roller to track 35 in a manner such that the load is distributed essentially equally over the entire width of the track and there is no excessively high pressure exerted on any one particular area of the track's surface.

As the noncontrolled automobile is being moved through the car wash, tire 39 will have a tendency to wander over the surface of the car wash track. However, the amount of wandering by the tire is limited due to the provision of upstanding sidewalls 47. When the tire wanders it does not contact the rear roller because the forward roller is located between the rear roller and the tire. As it is apparent from the drawings, forward roller 5 need not extend across the entire width of the track. However, it should be long enough to prevent tire 39 from wedging between the ends of the roller and the upstanding sidewalls. Therefore, the length of the forward roller is primarily dependent upon the width of the car wash track.

In order to provide ease of manufacture and low production costs, the forward and rear rollers as well as their respective securing components are identical in all respects. However, this need not be the case as witnessed by the fact that the forward roller can be replaced by a roller having a smaller diameter than that of the rear roller. In both cases it should be noted that the forward and rear rollers rotate about two distinct axles so that they have different axes of rotation. Furthermore in both cases it is the forward roller that contacts the rear portion of the automobile tire and it is the rear roller which transfers the force exerted on the dolly to the car wash track.

Forward roller 5 is mounted such that its axis of rotation is above the axis of rotation of rear roller 3. Such an arrangement is required if the forward and rear rollers have identical dimensions because the forward roller must be remote of the car wash track so that it is freely rotatable. The force exerted on the dolly must not be transferred to the track through the forward roller. As can be appreciated the mounting arrangement may be somewhat different from that described above if the forward roller has a smaller diameter than the rear roller. In the latter arrangement, the axis of rotation of the forward roller may be lowered and the upper reach of the forward roller may be lower than the upper reach of the rear roller. However, again the forward roller must be located such that its lower reach does not contact the surface of the car wash track. In all mounting arrangements the forward roller is mounted so as to preclude contact between the automobile tire and the rear support roller and there is no binding between the automobile tire and the roller in contact with the track which is rotating in the same direction as the automobile tire.

In the embodiment shown in the drawings the forward roller is mounted such that its upper reach is above the upper reach of the rear roller. The purpose of this arrangement is to raise the forward roller with respect to the automobile tire.

Another method of raising the freely rotatable roller is to use a rear roller having a diameter greater than that of the forward roller and to mount the rollers on the dolly such that the upper reaches are approximately equal. As earlier mentioned, the height of the entire dolly must be such that there is clearance between the dolly and the bottom of an automobile. This distance of course varies from car to car.

As can be seen from the drawings, the dolly is non-symmetrical due to the required positioning of the freely rotatable roller with respect to the support roller and for practical purposes, it is not generally possible to tighten the chains to the extent required to prevent all forward tipping of the dolly when it is under load. This forward tipping results in contact between the safety bar and the track and the bar has therefore been adapted to rotatably engage the track through the provision of sleeve 10 to prevent its binding on the track. However, as can also be clearly seen from the drawings, the lower reach of the safety bar and its sleeve is above the lower reach of the support roller, so that when the dolly is free of load, the safety bar is out of contact with the track. With this arrangement, the safety bar does not rotate when the dolly is being moved over the track, and acts as a block to the entrance of the operator's foot beneath the freely rotatable roller, and because it does not rotate under these conditions, it does not tend to ride over the operator's foot. The fact that the safety bar rotates when the dolly is under load is offset by the fact that the operator is blocked from the dolly by the automobile.

The safety bar could obviously be constructed such that the entire bar is adapted to rotate rather than be provided with a rotatable sleeving. With either one of these arrangements, the lack of binding between the safety bar and the track results in a much less frequent replacement of the safety bar and less damage to the track than would otherwise be the case.

The above description relating to a preferred embodiment of the present invention has only been made in reference to a car wash dolly. As can be appreciated, the dolly of the present invention can also be used for moving other types of heavy objects across a supporting surface. Therefore, although various preferred embodiments of the invention have been described herein in detail, it will be appreciated from one skilled in the art that variations may be made thereto without departing from the spirit of the invention or the scope of the appended claims.

The embodiments of the invention in which an exclusive property or privilege is claimed are defined as follows:

1. A double dolly for use on a conveyor in moving an object over a supporting surface; said dolly consisting of a first roller which rotates about a first axle, a second roller which rotates about a second axle with its lower reach being above the lower reach of the first roller, a frame for securing said rollers and axles to the conveyor, and a safety bar secured to said frame in advance of and below said second roller proximate the supporting surface; said second roller being freely rotatable when free of load and being positioned to prevent contact between said first roller and the object which said second roller rotatably engages; said first roller being a support roller for transferring load exerted on said dolly to the supporting surface; said safety bar being clear of the supporting surface when the dolly is free of load and being adapted to rotatably engage the supporting surface and to prevent binding upon coming into contact therewith when the dolly is under load.

2. A double dolly as claimed in claim 1, wherein said safety bar comprises a fixed central shaft and a sleeve rotatably mounted on said shaft.

3. A double dolly as claimed in claim 2, for use in a carwash.

* * * * *